C. Forschner,
Sausage Stuffer.
No. 95,454. Patented Oct. 5, 1869.
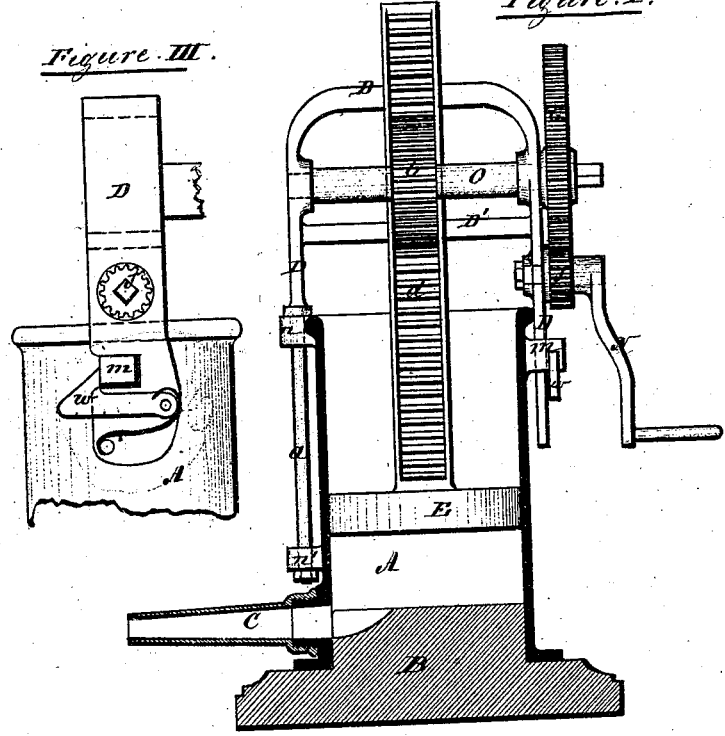
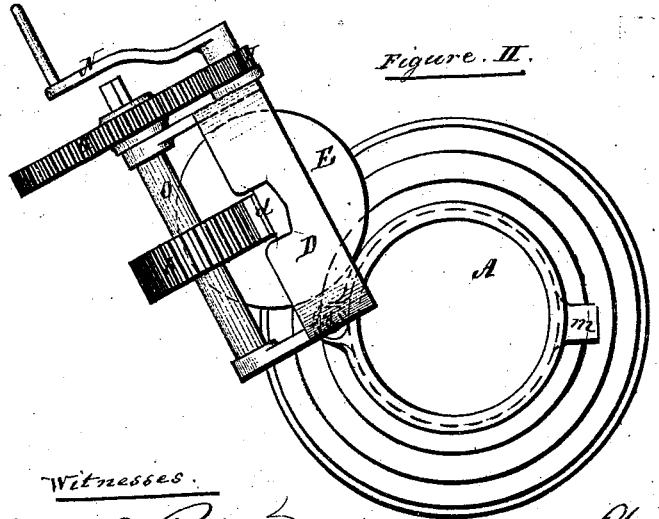
Witnesses  
Inventor  
Chas Forschner

UNITED STATES PATENT OFFICE.

CHARLES FORSCHNER, OF NEW YORK, N. Y.

Letters Patent No. 95,454, dated October 5, 1869.

IMPROVED SAUSAGE-STUFFER.

The Schedule referred to in these Letters Patent and making part of the same.

*To all whom it may concern:*

I, CHARLES FORSCHNER, of the city, county, and State of New York, have invented certain Improvements in Sausage-Machines, of which the following is a specification.

My invention relates to the arrangement and combination of the gearing with the cylinder, in such a manner that the said gearing and piston or plunger shall be capable of being readily removed on one side, so as to allow the cylinder being easily cleaned and filled again.

Figure I is an elevation, with the cylinder in section, of a machine embodying my invention.

Figure II is a plan of the same, showing the piston and gearing moved on one side.

Figure III is an elevation of part of the machine, showing that side of the machine which is at the right hand in Fig. I.

Similar letters represent similar parts.

A is the cylinder, secured to a suitable sole-plate, B, and provided with a nozzle, C, to which the skin of the sausage to be filled is attached.

To this cylinder A, a frame, D, is attached, on which the gearing to operate the piston or plunger E is fastened.

This frame D is provided with a bolt, $a$, on one side, turning in suitable lugs $n\ n'$, attached to the cylinder A, and capable of turning around said bolt.

The other side of said frame D is made to fit around the projection $m$, fast to the side of the cylinder A, and is provided with a spring-catch, $w$, which locks and secures the frame securely to said projection $m$.

The gearing consists of a pinion, $b$, operating the rack $d$, attached to the piston E, which is guided in the frame D and cross-piece D', the wheel G, and pinion J, which latter is operated through the handle N.

When the piston is to be worked upward, the handle N may be attached to the end of the shaft O, carrying the wheel G and pinion $b$, whereby this operation is performed in a shorter time.

Whenever the cylinder A requires cleaning or to be filled, the piston E is moved upward, so as to come clear of the top of said cylinder, when the spring-catch $w$ is pressed downward clear of the projection $m$, and the frame D, with all the gearing and piston, turned around the centre of the bolt $a$ until clear of the opening of said cylinder A, as represented in Fig. II, whereby the operation of cleaning and filling the cylinder A is facilitated.

When the cylinder A is filled, the frame D is turned around again and firmly locked to the projection $m$, by means of its catch $w$, and the meat forced out of the cylinder through the nozzle C, by means of the action of the piston E, operated by its gearing.

What I claim as my invention, and desire to secure by Letters Patent, is—

The arrangement and combination of the frame D with the cylinder A, by means of its bolt $a$ and catch $w$, in combination with the projection $m$, on the cylinder, substantially as and for the purpose hereinbefore set forth.

CHARLES FORSCHNER.

Witnesses:
HENRY E. ROEDER,
LOUIS STUMM.